Feb. 15, 1966 LE ROY R. BOGGS 3,235,429
METHOD AND APPARATUS FOR MAKING TUBULAR ARTICLES
OF FIBER REINFORCED RESIN MATERIAL
Filed Jan. 30, 1962 7 Sheets-Sheet 1
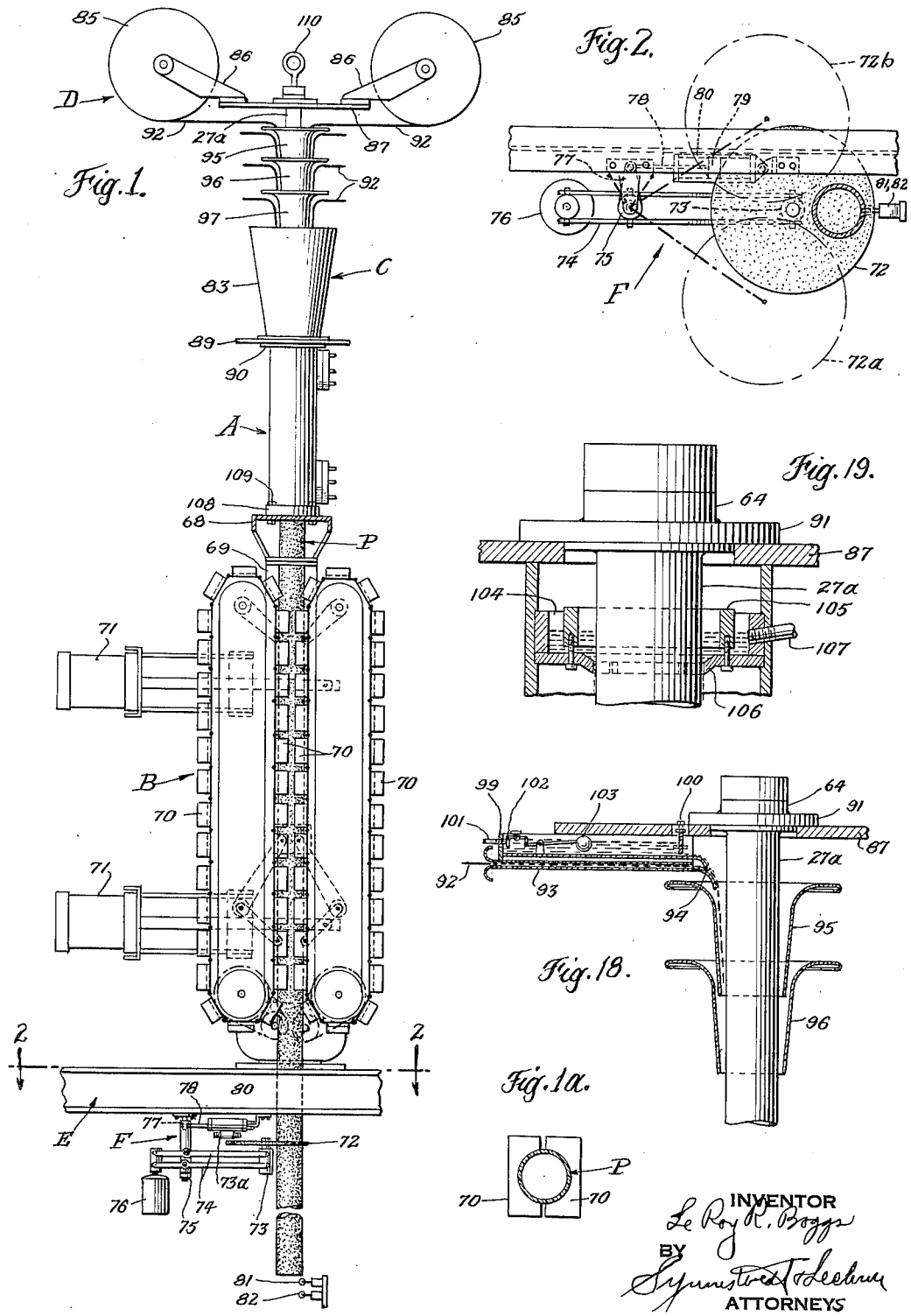
INVENTOR
Le Roy R. Boggs
BY
ATTORNEYS

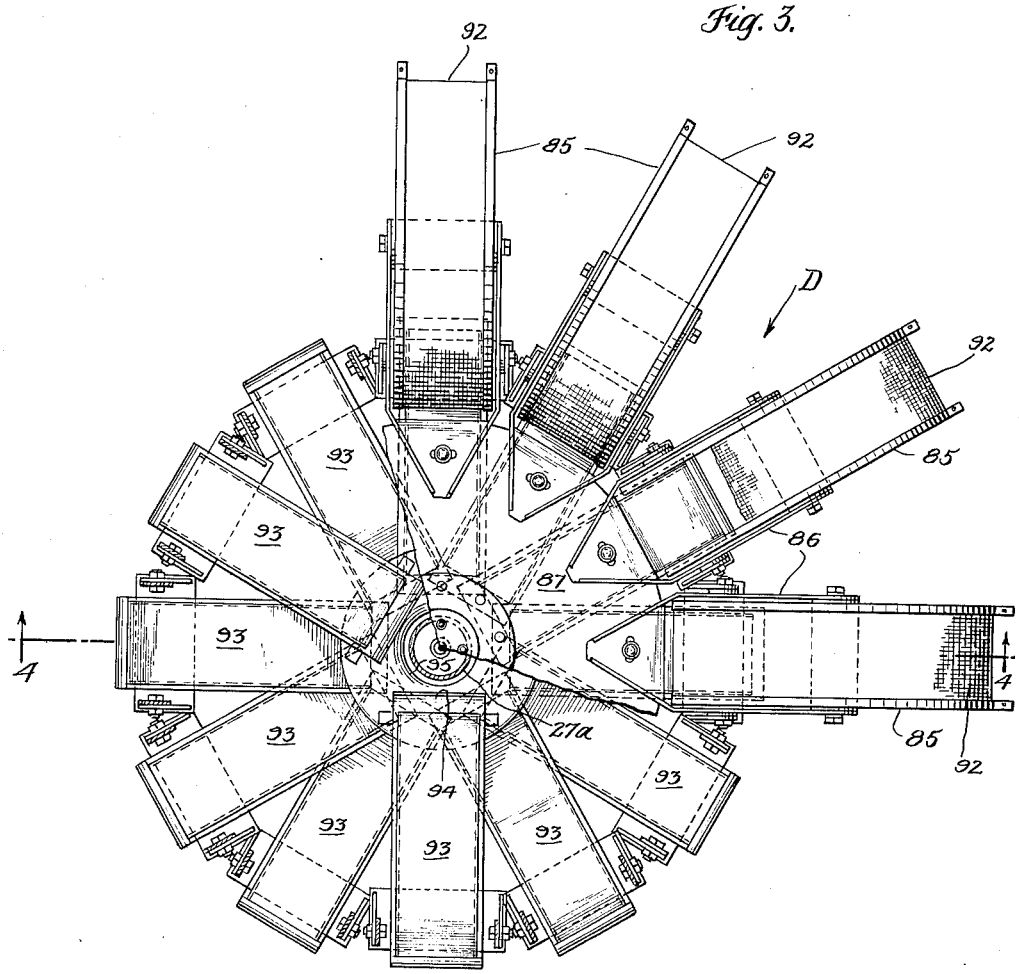

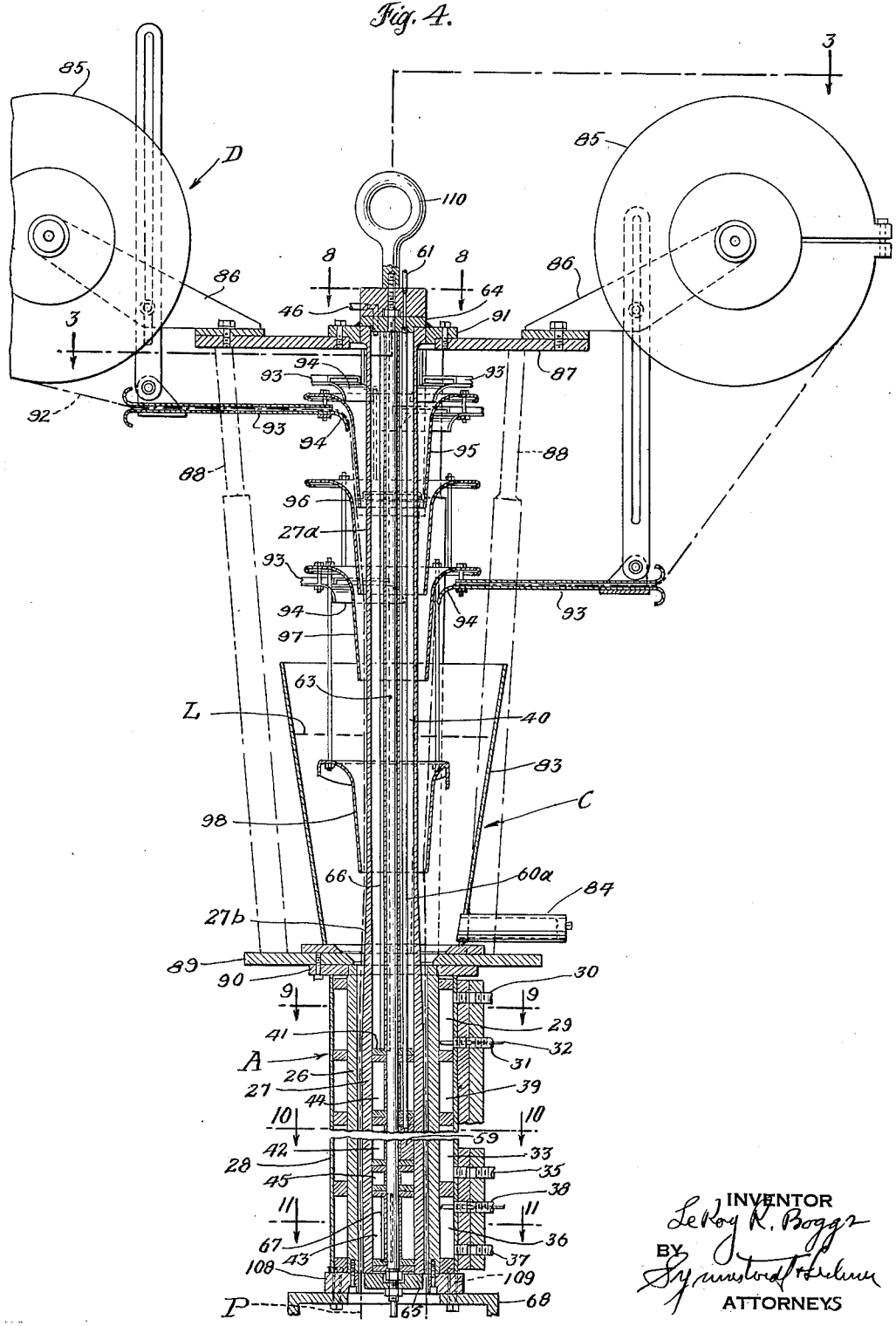

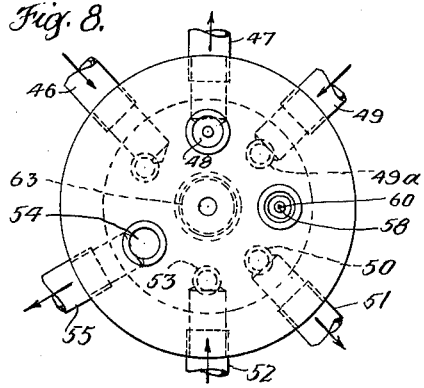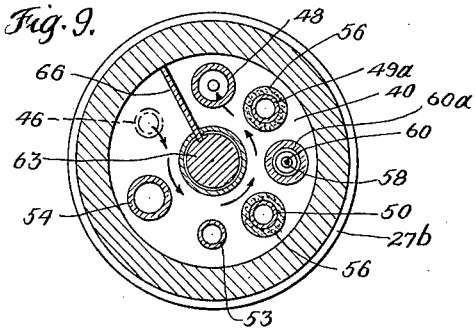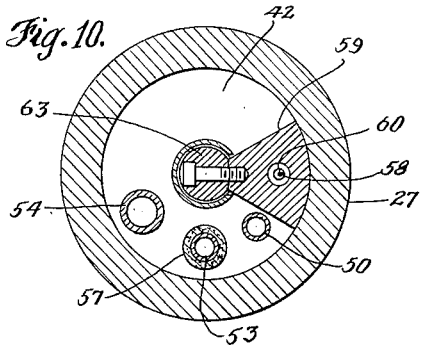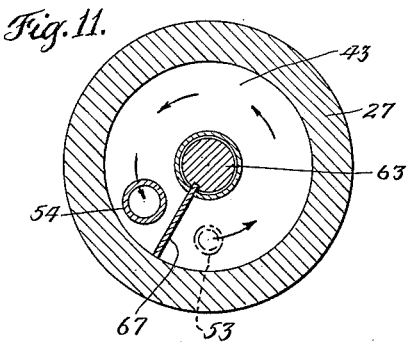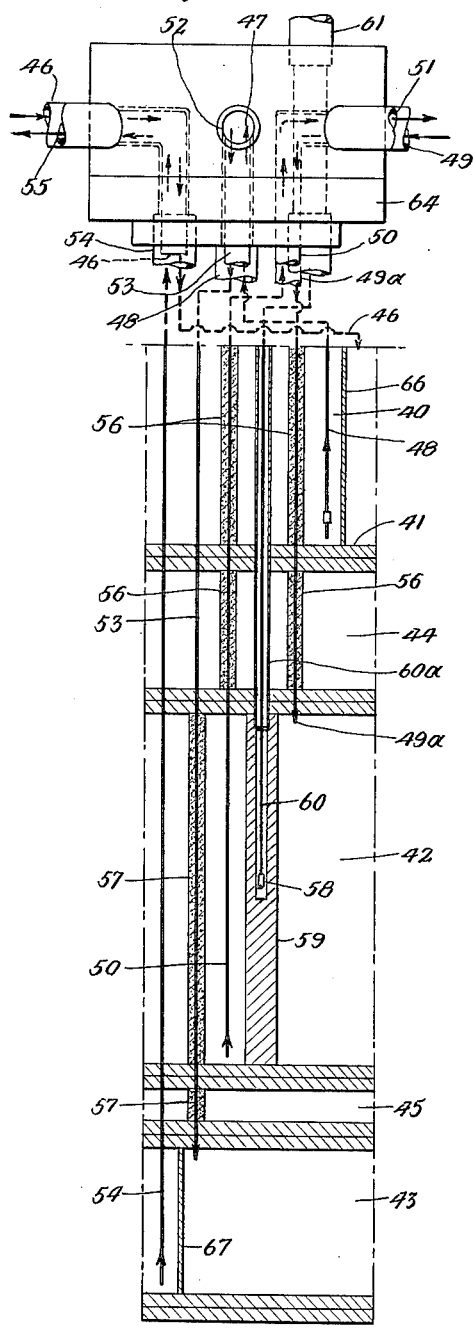

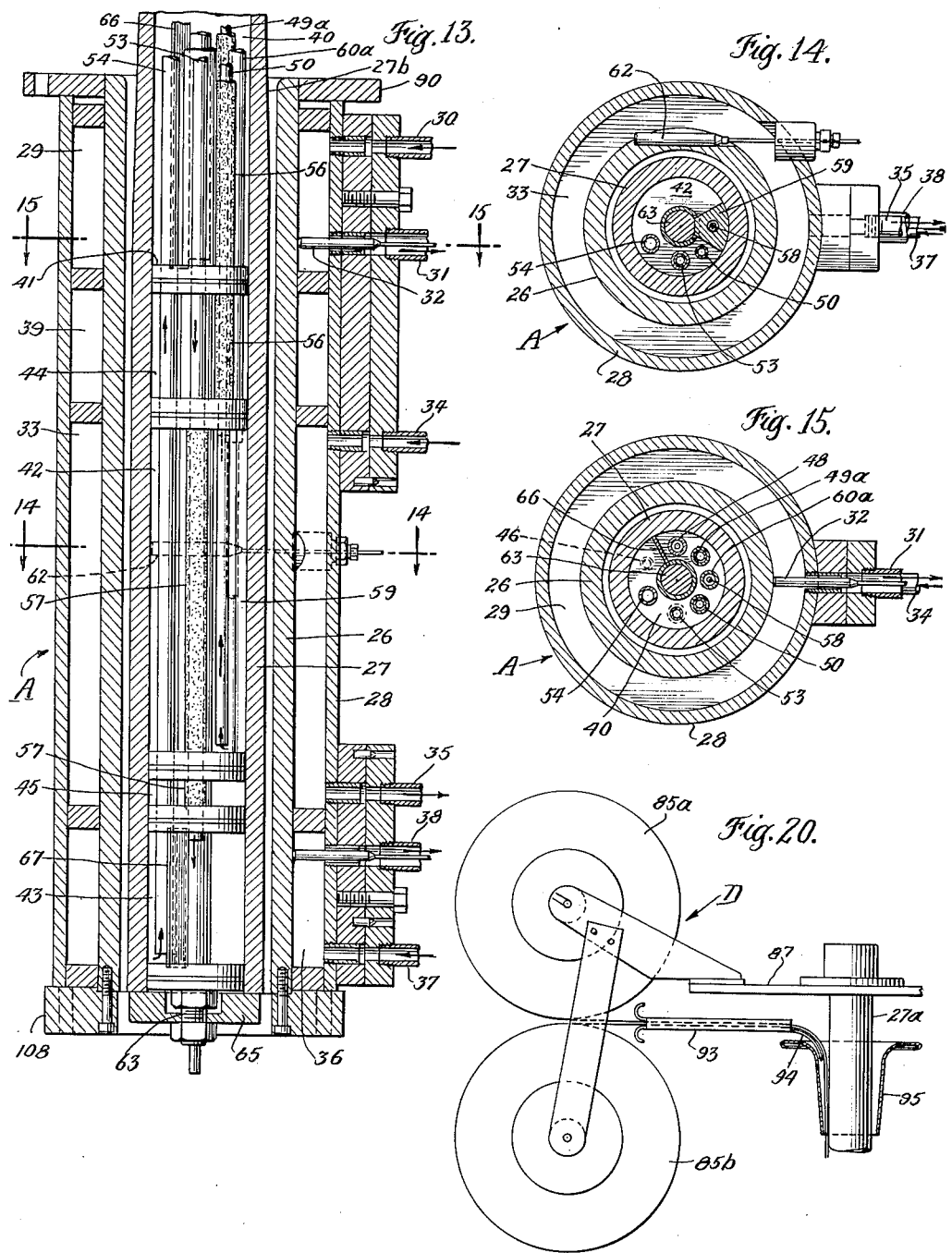

Feb. 15, 1966     LE ROY R. BOGGS     3,235,429
METHOD AND APPARATUS FOR MAKING TUBULAR ARTICLES
OF FIBER REINFORCED RESIN MATERIAL
Filed Jan. 30, 1962     7 Sheets-Sheet 6

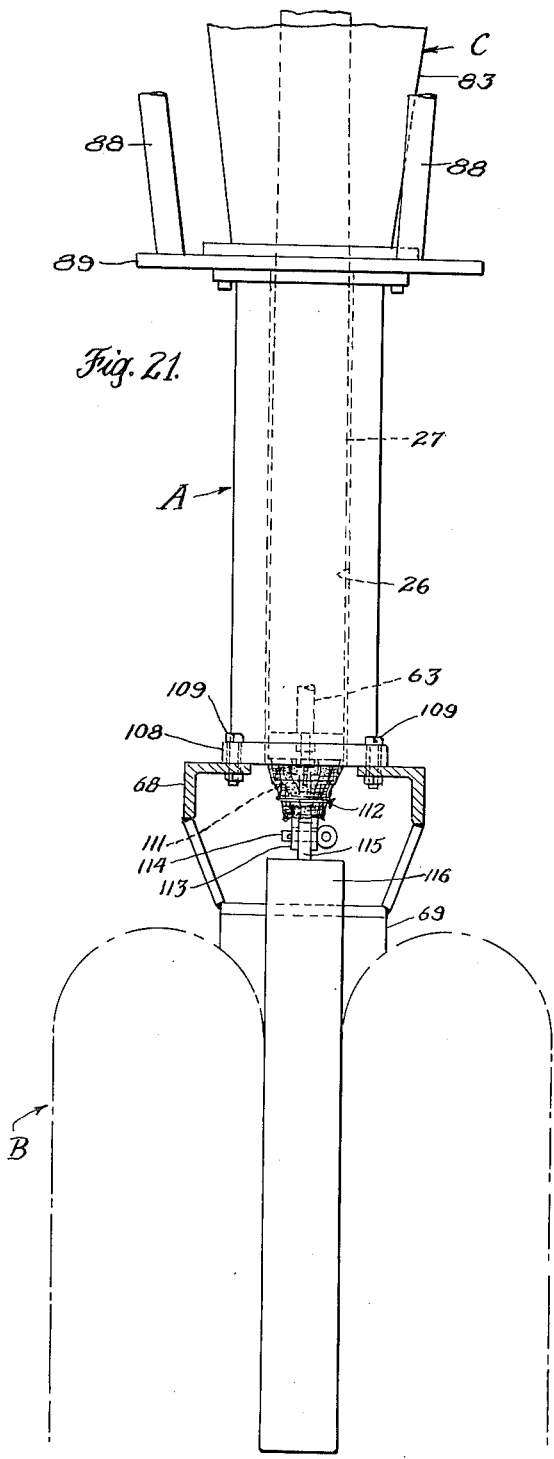
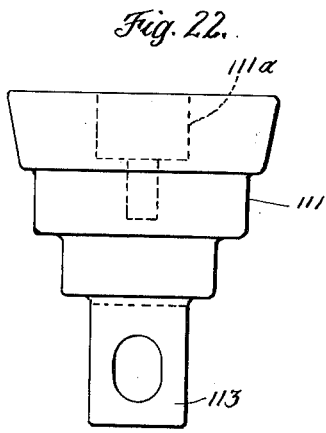
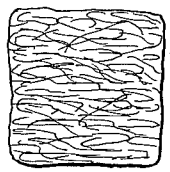
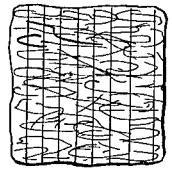
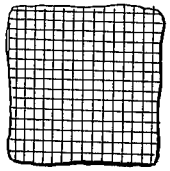

United States Patent Office 3,235,429
Patented Feb. 15, 1966

3,235,429
METHOD AND APPARATUS FOR MAKING TUBULAR ARTICLES OF FIBER REINFORCED RESIN MATERIAL
Le Roy R. Boggs, Bristol, Tenn., assignor to Universal Moulded Fiber Glass Corp., Bristol, Va., a corporation of Delaware
Filed Jan. 30, 1962, Ser. No. 169,908
23 Claims. (Cl. 156—166)

The present application is a continuation-in-part of my prior application Serial No. 44,050 filed July 20, 1960, issued May 25, 1965 as Patent 3,185,603, and of my prior application Serial No. 138,350 filed September 15, 1961, issued May 25, 1965 as Patent 3,185,746.

This invention relates to the production or fabrication of articles composed of resin material incorporating fiber or fibrous reinforcement. The invention is particularly concerned with the production of articles by the use of liquid heat hardenable or heat setting resins incorporating glass fibers, fabrics or mats as reinforcement.

While certain features of the invention are applicable to the production of articles of a variety of types, many features of the invention are particularly adapted to the production of tubular articles, such as pipe, either of angular or circular cross section.

The invention is concerned with the general type of technique disclosed in my prior applications Serial Nos. 2,760, filed January 15, 1960 (refiled as application Serial No. 408,488, November 3, 1964), 44,050, filed July 20, 1960, and 115,633 filed June 8, 1961, in which liquid heat hardenable or thermosetting resin material is delivered into the entrance end of a forming passage in a die structure, fibrous reinforcement also being fed into the entrance end of the forming passage. In this type of technique the resin material is heated during its travel through the forming passage, and the materials and the article being formed are fed through the system by means of a puller mechanism arranged beyond the delivery end of the forming passage and engaging or gripping the solidified article and drawing it through and out of the forming passage. The present application is a continuation-in-part of said prior applications.

The present invention contemplates a number of improvements both in the method and apparatus for carrying out the technique referred to above, especially as applied to the production of tubular articles. In addition the invention provides for the production of tubular articles which themselves are of improved construction.

Additional objects and advantages of the invention include the following:

The provision of a method and apparatus for producing various articles and especially articles in a tubular form which are highly reliable from the standpoint of long continued or uninterrupted operation, it being possible with the apparatus of the invention to continue the production of a given tube, for example, almost indefinitely without shutdown, or at least for a matter of weeks. In this connection, by long continued or continuous operation or production, as referred to herein, it is not to be understood that the production rate is not varied or momentarily stopped. Indeed, it is of advantage that the method and apparatus of the invention make possible variation in rate of production and also even temporary stoppages of the apparatus, without marking or otherwise impairing the quality of the article being produced when the apparatus is again started, providing the intervals of stoppage are not excessively long.

The invention also provides a method by which in the production of pipe or other tubular articles, the reinforcement may be laid up in layers or plies as it is fed into the forming passage, thereby providing highly effective and uniform reinforcement throughout the entire wall thickness of the article being formed. In this connection the invention further provides for the delivery of a plurality of strips of fibrous reinforcement in each layer or ply, the several strips of each layer being arranged in substantially edge-to-edge relation throughout the circumference of the article being formed, and the strips of the several layers or plies being staggered so that the strips of one layer overlap the joints between the strips of adjacent layers. In this way, highly effective reinforcement from the standpoint of strength characteristics is built into the product, notwithstanding the fact that the reinforcement is made up of a multiplicity of separate strips of reinforcing material. Good hoop strength as well as axial strength is thereby provided.

Another object of the invention is a special arrangement and method by which the impregnation of the various fiber reinforcements is thoroughly accomplished prior to entrance of the reinforcements into the forming device, notwithstanding the fact that the total reinforcement is made up of a multiplicity of layers or plies.

Another object of the invention is to provide a puller mechanism particularly useful in the production of pipe in which a very substantial gripping force may be applied to the formed and solidified pipe to pull it out of the forming passage without, however, damaging or crushing the formed pipe.

The invention also provides automatic means of novel type for cutting off the formed article, for instance pipe, at regular intervals.

Still further the invention contemplates an improved article such as a pipe incorporating in the wall thereof a plurality of plies or layers of reinforcement strips, the innermost and outermost of which both have appreciable fiber orientation axially of the pipe, together with one or more intervening layers or plies composed at least predominantly of fibers which are randomly oriented. This has a number of advantages which will further appear as this description proceeds.

In accordance with another aspect of the invention, special arrangements, both from the standpoint of method and from the standpoint of apparatus are provided to facilitate initiating the operation of producing pipe. In this connection it is noted that certain features of the starting operation herein contemplated are also disposed in my copending applications Serial No. 44,050, filed July 20, 1960, and Serial No. 138,350 filed September 15, 1961, and in that respect the present application is a continuation-in-part of said prior applications. The present application contemplates certain improvements in the arrangements of the apparatus and also in the method steps which further facilitate and increase the reliability of the starting operation. For example, the invention of the present application contemplates the mounting of the supply means for the resin material and for the reinforcement on the die structure and the arrangement of the die structure for ready separation from the puller mechanism, so that the threading of the reinforcement through the forming passage for initiating the operation may be effected in a simple manner, the apparatus also providing for separate or independent support of the puller mechanism so that the puller mechanism is not disturbed when the die structure and supply means are separated therefrom.

*Brief description of figures*

Other objects and advantages will appear more fully from the following description referring to the accompanying drawings in which:

FIGURE 1 is a side elevational view with certain parts shown only in outline of an apparatus constructed according to the present invention for producing pipe;

FIGURE 1a is a fragmentary somewhat diagrammatic plan section through the formed pipe and showing the gripping elements of the puller mechanism engaging the pipe;

FIGURE 2 is a plan view on an enlarged scale taken substantially as indicated by the line 2—2 on FIGURE 1 and showing certain arrangements of the cut-off mechanism provided;

FIGURE 3 is an enlarged plan view illustrating the upper end of the apparatus of FIGURE 1, the view showing certain supply reels for fibrous reinforcement, but also having parts broken away so as to illustrate some of the guide devices lying below the supply reels, FIGURE 3 being taken approximately as indicated by the line 3—3 on FIGURE 4;

FIGURE 4 is a vertical sectional view taken substantially as indicated by the section line 4—4 on FIGURE 3, and showing parts of the die structure and the die core which is positioned therein, and also the resin reservoir, guide devices for reinforcement strips and supply reels;

FIGURES 5, 6 and 7 are fragmentary plan views of guide arrangements used for several of the plies or layers of fibrous reinforcement fed into the forming device;

FIGURES 8 to 11 inclusive are horizontal, enlarged views taken as indicated by the section lines 8—8, 9—9, 10—10 and 11—11 applied to FIGURE 4, FIGURE 8 being a plan view and FIGURES 9, 10 and 11 being sectional views, all of these views illustrating certain of the heating and cooling chambers and passages incorporated in the structure of the die core;

FIGURE 12 is a somewhat diagrammatic view of the pipe connection fitting arranged in the upper end of the die core and also showing in a diagrammatic or developed way the disposition of passages or chambers in the core structure;

FIGURE 13 is a vertical sectional view through the die structure and the lower portion of the core structure which cooperates with the die itself to form or define the annular forming passage through which the resin materials and reinforcement are fed for the fabrication of pipe as shown in FIGURE 1, this view being on an enlarged scale as compared with the illustration of these parts in FIGURE 4;

FIGURES 15 and 15 are plan sectional views taken as indicated by the lines 14—14 and 15—15 on FIGURE 13;

FIGURE 18 is a fragmentary view of certain details of a resin feeding mechanism preferably employed in the embodiment illustrated in FIGURES 1 to 17;

FIGURE 19 is a view of a resin feeding arrangement of modified form as compared with that of FIGURE 18;

FIGURE 20 is a view illustrating an alternative embodiment in which a pair of reinforcement supply reels are arranged to deliver reinforcing strips through a common guide means;

FIGURE 21 is a somewhat diagrammatic outline view of portions of the equipment shown in FIGURE 1 for example but particularly illustrating certain devices and steps employed in the start-up operation;

FIGURE 22 is an elevational view of a part used in the start-up procedure shown in FIGURE 21; and FIGURES 23, 24 and 25 are fragmentary views illustrating three different forms of glass fiber reinforcement material preferably employed in accordance with the present invention; FIGURE 23 showing a felted or mat type of strip material in which the strands or filaments are randomly oriented; FIGURE 24 showing a mat type material incorporating not only randomly oriented fibers or filaments but also illustrating certain fibers which are oriented in one direction; and FIGURE 25 showing a woven fabric type of reinforcement.

General description

Figure 16:
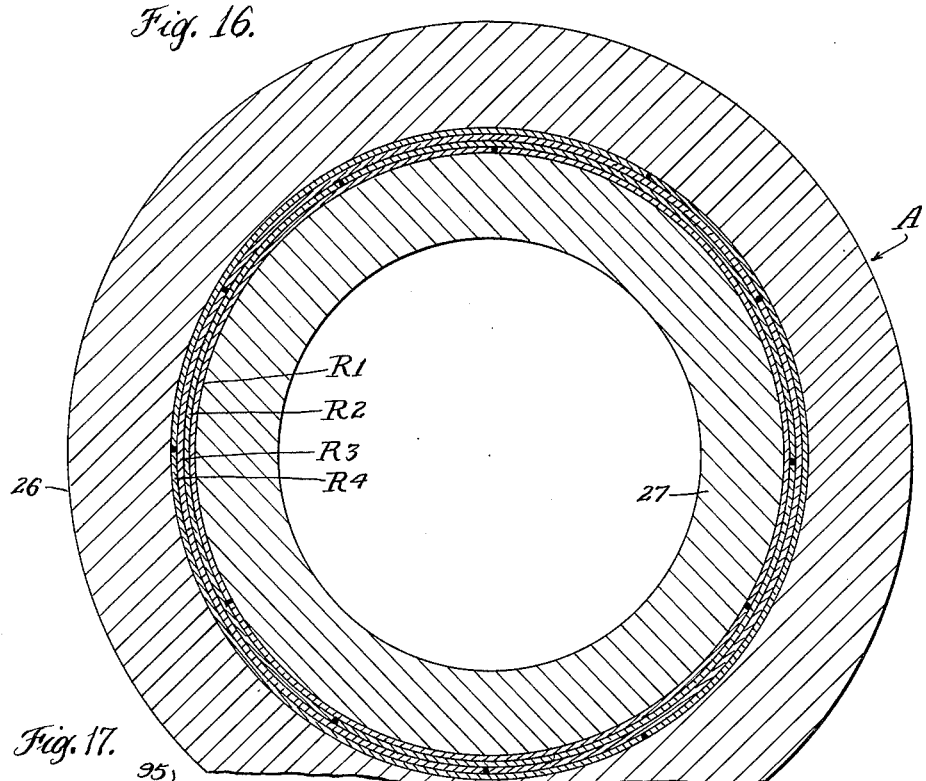
FIGURE 16 is a still further enlarged view illustrating in horizontal section the inner wall of the die itself and the outer wall of the core structure which cooperate to define the annular forming passage and also showing the manner of lay-up of the various layers or plies of reinforcement used in making pipe according to the present invention.
Figure 17:
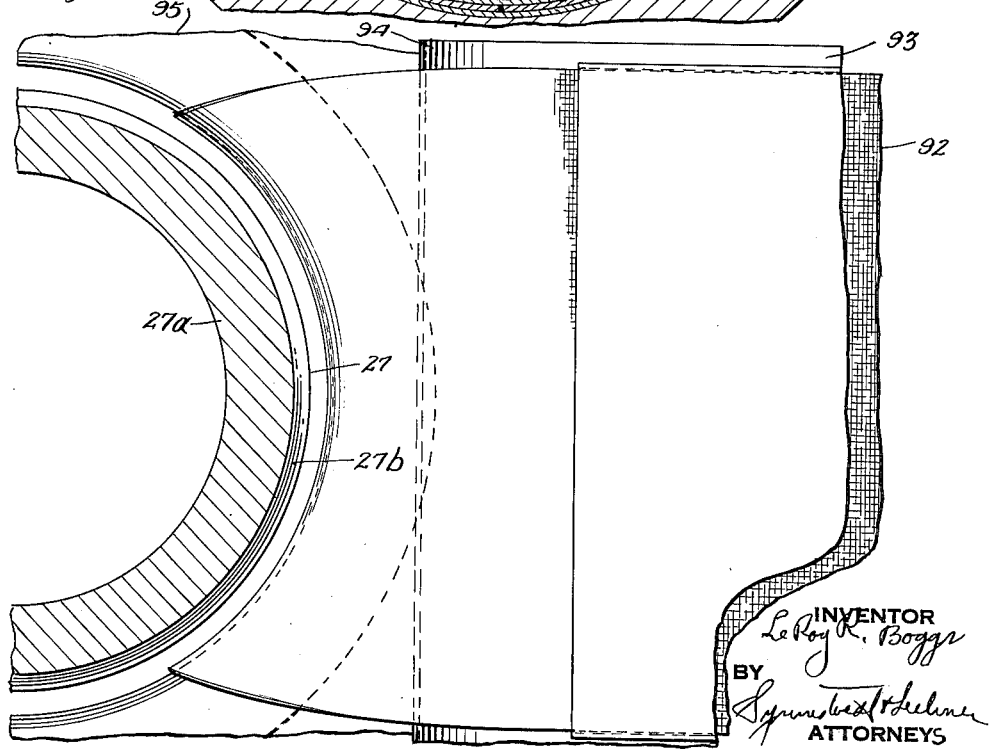
FIGURE 17 is a plan view on the scale of FIGURE 16 illustrating certain details of a fibrous strip guide and the arrangement thereof for delivering the reinforcement strip into the forming passage.

The general arrangement of the equipment is illustrated in FIGURE 1 from which it will be seen that the equipment comprises a die structure indicated by the letter A, a puller mechanism of the crawler tread type indicated by the letter B, the die structure being arranged vertically so as to deliver the formed pipe P downwardly by virtue of operation of the puller mechanism. Above the die structure is a resin supply pan C and above the resin supply pan is supply means D for fibrous reinforcement, including supply reels and guides.

Below the puller mechanism B is the floor or other structural support E beyond which the pipe P is discharged downwardly, the support structure E also serving to mount the cut-off mechanism F.

Although various components of the equipment may be varied in size and proportions, depending upon the size and type of piece being made, in a typical case for making pipe of about 5 inch diameter and 3/16 inch wall thickness, the die structure A may be about 30 inches long and the puller mechanism B of the order of 6 feet long. Thus it will be seen that in many instances the equipment is of very substantial size, and for convenience in operating and attending the equipment, floors or decks may be arranged at suitable points, for instance at the level of the structure E and also advantageously at about the lower end of the die structure A so that an attendant may have ready access to the resin supply pan or reservoir C and also to the reinforcement supply and feed mechanism D.

Generally described the method or operation includes introducing liquid heat hardenable resin into the reservoir C and feeding fiber reinforcement from the supply means D through guide devices into and through the resin in the reservoir C and thence into the upper or entrance end of the forming passage in the die structure A. Heat is applied to the resin in a certain zone of the forming passage in order to solidify the resin and the solidified pipe or piece indicated at P is drawn out of the lower or delivery end of the forming passage by means of the crawler tread puller mechanism B. As the piece P is delivered downwardly from the puller mechanism it passes between elements or beams of the supporting structure and downwardly past the cut-off mechanism F which is arranged to operate so as to cut off predetermined lengths of the pipe, as will be further explained hereinafter.

Detailed description of die structure

The arrangement of the die structure is shown in greater detail in FIGURES 4 and 13 to 15. The die structure includes the external part 26 in the form of a cylinder or sleeve in which a core structure 27 is arranged, the core also comprising a cylindrical member which extends throughout the vertical dimension of the die part 26 and which also has an upwardly projecting extension 27a (see FIGURE 4), the extension 27a being of smaller outside diameter and thinner wall section than the part 27, the two parts being joined by a tapered part 27b. The tapered zone extends downwardly within the die part 26 so that the annular forming passage formed by the parts 26 and 27 has a tapered or enlarged entrance end portion, for purposes which will be explained more fully herebelow.

Surrounding the die part 26 is another sleeve or jacket 28 which is divided into a plurality of zones for heat exchange media. The zones include an uppermost zone 29 for a cooling medium such as water, inlet and outlet connections 30 and 31 being provided for the water circulation. A temperature responsive controlling device 32 may be provided for regulating the flow of water. The zone 29 is located around the inlet end portion of the forming passage between the die part 26 and the core part 27b and the circulation of water through this zone cools the resin in the inlet end portion of the forming passage and thereby prevents setting or solidification of the resin in that portion of the forming passage. This feature is of importance for reasons fully brought out in my copending applications Serial No. 2,760, filed January 15, 1960, and Serial No. 115,633 filed June 8, 1961.

In the mid region of the die structure, there is another chamber 33 within the jacket 28, this chamber being provided for the circulation of a heating medium, for instance steam, inlet and outlet connections 34 and 35 being provided for the steam circulation. The heating of the resin effected by the flow of steam through this chamber aids in solidifying or setting the resin. At the lower end of the forming device there is a chamber 36 providing for circulation of a cooling liquid, for instance water, inlet and outlet connections 37 and 38 being associated with this chamber. The action of this cooling chamber is to reduce the temperature of the solidified article below the heat distortion point prior to delivery of the article from the lower end of the forming passage.

Intermediate the upper cooling chamber 29 and the central heating chamber 33 is a chamber 39 in the nature of a dead space intervening between the upper cooling chamber and the heating chamber and serving to provide a more gradual increase in temperature as the resin moves downwardly through the forming passage. This avoids certain tendency for the resin to decompose.

The core structure similarly is divided into a plurality of superimposed chambers, the uppermost chamber of which, indicated by the number 40, extends upwardly through the upwardly projecting extension of the core all the way to the top of the core structure. This chamber also extends downwardly into the tapered part of the core lying within the entrance end portion of the forming passage, the lower end of the cooling chamber 40 being defined by the bulkhead 41. Chamber 42 in the portion of the core within the die is provided for the circulation of a heating medium and, in the bottom portion of the core there is a chamber 43 provided for cooling liquid. From FIGURE 13 it will be noted that the chambers 42 and 43 lie in general in the same vertical region as do the chambers 33 and 36 of the jacket 28. Dead space or chamber 44 is also provided in the core between the upper cooling chamber 40 and the heating chamber 42 and a similar dead space 45 is provided in the core between the lower end of the heating chamber 42 and the bottom cooling chamber 43. The dead space 44 serves the same purpose as the dead space 39 in the die jacket.

The piping and connections for circulation of cooling and heating media through the chambers in the core structure are shown not only in FIGURES 13, 14 and 15 but also in FIGURES 8 to 11 inclusive and in the diagrammatic illustration of FIGURE 12.

Inlet connection 46 serves to introduce cooling water into the core chamber 40 and this cooling water leaves the chamber 40 via the outlet connection 47, the outlet connection being associated with the upper end of upright pipe 48 which extends downwardly to a point adjacent the lower end of the core chamber 40 (see FIGURES 12, 13 and 9). Inlet connection 49 serves to introduce steam into the chamber 42 through pipe 49a, and condensate is withdrawn from the heating chamber 42 via pipe 50 and the discharge connection 51. Cooling liquid is supplied to the bottom chamber 43 by inlet connection 52 communicating with the pipe 53 and the water is discharged from chamber 43 through pipe 54 communicating with outlet connection 55.

With reference to the heating and cooling connections and piping within the core it may be noted that many of these parts have been omitted from the illustration in FIGURE 4 for the sake of clarity.

The inlet connection for the steam introduced into chamber 42 and the outlet connection for the condensate are provided with lagging or insulation as shown at 56 in the region where these connections pass through the upper cooling chamber 40 and the dead space 44, as seen in FIGURES 9, 12 and 13. Similarly lagging 57 is provided around the inlet connection for the cooling liquid introduced into chamber 43 in the region where this connection passes through the heating chamber 42 and also in the region where this connection passes through the dead space 45.

A temperature indicator or capillary bulb 58, for reading the temperature in the heating zone 42, is recessed within the segmental partition 59 of the core (see FIGURE 10), this device having a connection 60 extended upwardly through a pipe 60a and out of the core structure at 61. A temperature indicator 62 (see FIGURES 13 and 14) is also provided in the heating space 33 of the die itself.

All of the core parts are assembled and secured together by means of the central rod 63 which extends from the top closure plate 64 for the core all of the way down to the bottom closure plate 65 (see FIGURES 4 and 13).

A baffle 66 lying in a radial plane at one side of the core within the upper cooling zone 40 prevents short circuiting of the cooling liquid from the inlet to the outlet (see FIGURE 9). A similar baffle 67 serves the same purpose in the lower chamber 43 of the core (see FIGURE 11).

From the foregoing it will be seen that the external die part and the core have corresponding similarly located cooling, heating and cooling chambers. The heat transfer media circulated through these several passages is controlled to provide a certain temperature curve for the resin passing through the system. First, the temperature in the inlet end of the forming passage, where the reinforcement is being compacted or compressed and from which excess resin is returned to the resin pan, is kept sufficiently low to prevent an appreciable setting of the resin. This is important to avoid gradual build-up of solidified resin in the resin pan. This same purpose is also served by the cooling of the upwardly projecting core extension, it being noted that the core extension is cooled in the resin in the resin pan and all the way up to the upper end where the additional resin supply is delivered to the core, as described herebelow with reference to FIGURES 18 and 19.

The heating chamber in the mid region of the external die part and the core provide for setting or curing of the resin and thus for solidifying the article being formed in the mid region of the die structure in which the forming passage is of straight, i.e. of uniform cross section.

The final cooling chambers at the lower end of the external die part and the core provide for lowering the temperature of the solidified and formed article below the heat distortion point prior to exit or delivery of the formed article from the delivery end of the forming passage.

*Puller mechanism*

As best seen in FIGURES 1 and 4, the die structure A as a whole is mounted upon a bracket 68 which is supported on the upper end of the frame structure 69 of the crawler tread puller mechanism B. The lower end of this crawler frame structure is mounted upon the structural elements or flooring E as shown in FIGURE 1.

The crawler tread puller mechanism is of the same general type as that disclosed and claimed in my copending application Serial No. 142,749, filed September 18, 1961, issued as Patent 3,151,354, on October 6, 1964. The details of the mounting and driving of the crawler treads need not be considered in the present application. For further information reference may be made to the copending application just mentioned. However, certain points should be observed in connection with this crawler tread puller mechanism including the fact that there are a plurality of treads each having tread shoes 70 comprising blocks which are shaped to fit and engage the major portion of the circumference of the pipe P being made (see FIGURE 1a). Regardless of the number of crawler treads and gripping shoes, it is desirable that these shoes engage a substantial portion and preferably most of the periphery of the pipe, thus permitting high pressure to be applied without danger of collapsing the pipe. Each shoe is desirably provided with a rubber or other friction lining so as to be capable of developing a heavy pull on the pipe being made when the shoes are urged toward each other. Such gripping of the pipe by the shoes is provided for by the pneumatic cylinders 71 which serve to urge the two crawler treads toward each other in the manner disclosed in my copending application just referred to, and thus to effectively grip the pipe between the opposed pairs of tread shoes 70.

Cut-off mechanism

Below the flooring or supporting elements E, the cut-off mechanism F is arranged, as shown in FIGURES 1 and 2, to provide for the cut-off of the pipe in pieces of the desired length. This mechanism includes a cutting disc 72 mounted on the shaft of a motor 73 which in turn is carried by the parallel arms or levers 74 which are pivoted on horizontal pivots to the upright shaft 75. The weight of the levers, cutting disc and motor is counterweighted by a weight indicated at 76. The upright shaft 75 is mounted for turning motion about its own upright axis, this motion being controlled by an arm 77 which is connected to an operating rod 78 in turn fastened to a piston 79 working in a cylinder 80. The cylinder serves to swing the arms and thus the motor and the cutting disc through an arcuate path, the limits of which are indicated by the dot-dash circles 72a and 72b. In this way the cutting disc may be caused to engage and cut through the pipe P.

Although the details of the controls for this mechanism need not be considered herein, it may be noted that the operation of the motor and of the cylinder 80 is regulated by a pair of control devices 81 and 82 (see the bottom of FIGURE 1), the device 81 when engaged by the lower end of the pipe P acting to energize the motor 73 to drive the cutting disc and also to energize one solenoid of the double solenoid valve 73a of the cylinder 80 so as to swing the cutting disc through the arc provided for cutting off a length of the pipe (see FIGURE 2), i.e. from one of the positions 72a and 72b to the other of such positions. When a given length of the pipe has been cut off in this manner, that piece will drop by gravity and in so doing will engage the control device 82 which in turn de-energizes the cutting disc motor and the cylinder 80. The cutting disc then stays out of the path of the pipe P and thereby permits an additional length of the pipe to descend for a subsequent cut-off operation, at which time the cutting disc swings in the other direction to cut off another length of pipe.

The pivoted levers 74 and the counterweight arrangement 76 permit the disc to follow the downward motion of the pipe during an actual cutting operation, after which the counterweight will again raise the disc to the desired position for starting the next cut-off operation.

Resin supply means

Mounted upon and at the upper end of the die structure A is a resin reservoir shown at C in FIGURE 1 and comprising a deep resin pan or bucket 83 as appears in FIGURE 4. The bottom of this resin pan is open to the upper entrance end of the annular forming passage between the die part 26 and the core 27. A drain tube 84 is provided toward the bottom of the resin pan and is normally plugged. Resin is introduced into the pan so as to maintain a level such as that indicated at L in FIGURE 4.

Reinforcement supply means

As above mentioned, the fiber reinforcement for the article being made is supplied from supply means shown at D in FIGURE 1. As seen in more detail in FIGURES 3 to 7, this supply means includes a plurality of supply reels 85 arranged in a series around the axis of the core and die structure, each reel rotating in a radial plane, as clearly appears in FIGURE 3. Each reel is mounted by means of pairs of brackets 86 which are fastened to a central plate 87 which is mounted by means of struts 88 projecting downwardly from the plate 87 to a plate 89 which is fastened to the die structure through plate 90. At the center of the upper plate 87 is a fitting 91 which is welded to the upper end closure member 64 of the core structure, the fitting 91 resting upon and being bolted to the plate 87 and thereby constituting the support for the core structure which is suspended therefrom all the way down through the resin pan and the opening in the die part 26.

In the particular embodiment illustrated there are 12 reinforcement reels 85, each of these reels carrying a supply of a fibrous strip, such as diagrammatically indicated at 92 in FIGURES 1 and 4 and shown also in FIGURE 3. Each one of the strips leaves its supply reel 85 and passes through a guide, such as the tubular guide 93 having a passage therethrough of cross section roughly conforming with the cross section of the reinforcement strip. At the inner end of each guide is a curved element 94 serving to guide the strip in an arc downwardly for cooperation with additional guide members referred to below.

The reels or spools 85 and the reinforcement strips supplied thereby are divided into four groups, each group including three such reels and strips angularly spaced 120 degrees from each other about the upright axis of the structure and interdigitated with the reels of the other groups. The three strips derived from the first group of three reels are all brought radially inwardly through guides 93 (portions of two of which guides appear toward the top of FIGURE 4) in the same horizontal plane and the strips of this group pass downwardly over the curved lips 94 and thence into the upper or entrance end of a guide funnel 95 (see FIGURES 1, 3, 4 and 17). Similarly the second group of three strips are brought radially inwardly through the guides 93 (one of which appears toward the left of FIGURE 4 and all three of which appear in FIGURE 5) and these guides deliver the second group of three strips into the upper end of a funnel 96. A similar group of three guides 93 (see FIGURE 6) deliver the three strips of the next group into a funnel 97 (see also FIGURE 4). Finally the fourth or last group of strips is directed by a set of three guides 93 (one of which appears to the right of FIGURE 4 and all of which are shown in FIGURE 7), this last group of strips being delivered from the guides 93 into the lowermost funnel 98 which, as seen in FIGURE 4, is located below the level L of the resin in the resin pan. This funnel 98 has its upper edges cut off to provide access to the lower portion of the resin pan.

From the above it will be seen that the reinforcement strips are laid up in layers or plies around the central core structure, each layer or ply comprising three strips arranged in substantially edge-to-edge relation. Because of the interpositioning or interdigitating of the reels of the several groups around the upright axis of the apparatus, the reels of each group being angularly spaced 120 degrees from each other, the strips of each group are laid up in staggered relation in the manner which will be clear from examination of FIGURE 16. In this figure four layers or plies of reinforcement strips appear as indicated at R1, R2, R3 and R4. Each of these layers consists of three strips and it will be observed that the joints between the strips of each successive layer are offset from the joints in the next layer by 30 degrees. In this way the strips of one layer overlap the joints of the strips in the adjacent layers and this is of importance in enhancing the reinforcing value of the fibrous reinforcement material introduced into the system.

When making tubular articles, especially cylindrical pipe, it is preferred according to the invention to employ reinforcement strips in each layer or ply which strips are of such width as to substantially abut in edge-to-edge relation, although for certain purposes some overlapping may be employed. In the arrangement where the strips of each layer are of width so as to substantially about in edge-to-edge relation, it is preferred that the strips in each layer from the center toward the circumference be graduated in width, the narrowest strips being at the center and the widest strips at the circumference, so that the proper edge-to-edge relation is maintained notwithstanding the increase in circumferential dimension in the outer layers.

As the various layers of reinforcement strips are laid up around the core, this entire reinforcement structure passes downwardly through the resin in the resin pan 83 and through the bottom of the resin pan and thus enters the entrance end of the forming passage in the die structure, and as a result of the tapered portion of the core 27b the fibrous reinforcement is somewhat compressed or compacted as it enters the forming passage. This arrangement also provides for impregnation of the reinforcement strips with the resin, the action of the tapered entrance end of the forming passage enhancing the impregnation and serving also to aid in expelling any air which may be entrapped within the reinforcement.

*Additional resin supply means*

The thorough impregnation of the reinforcement with the resin is also enhanced by virtue of use of the device illustrated in FIGURE 18. This view shows one of the guides 93 of the first or top set of three such guides by which the strip 92 is delivered radially inwardly and thence downwardly through the funnel 95. Just above the guide 93 is a small resin pan 99 toward the inner end of which is an adjustable end wall 100 under which resin may flow for delivery to the upper surface of the fibrous strip 92 in the region of the curved lip 94. The resin may be introduced into the pan 99 by a supply pipe 101 controlled by a valve 102 which is operated by the float 103 so as to maintain a predetermined resin level in the pan 99. Three of such resin pans 99 are employed, one associated with each of the three guides 93 for the uppermost group of strips. In this way resin is applied to the inner surface of the innermost layer or ply of strips being fed into the system, i.e. resin is applied substantially at the interface between the reinforcement structure considered as a whole and the outer surface of the core. This not only increases the effectiveness of impregnation of the reinforcement with resin but further facilitates the sliding motion of the reinforcement structure against the surface of the core.

*Alternative resin and reinforcement supply means*

An alternative embodiment of mechanism for applying resin to the interface between the core and the fibrous reinforcement is illustrated in FIGURE 19. In this embodiment, at an elevation above the uppermost guides 93 (not shown in FIGURE 19) there is an annular resin supply chamber 104 surrounding the core and having an outlet which is controlled by an adjustable ring 105, this resin supply device having a bottom wall with a downwardly inclined lip indicated at 106 by which the resin is directed inwardly to contact the outer surface of the core and to flow downwardly on the surface of the core and thus ultimately meet the incoming fabric strips which make up the innermost layer of fibrous reinforcement. Resin may be supplied to the reservoir 104 through the supply pipe 107.

An alternative arrangement for the feed of certain reinforcement strips is illustrated in FIGURE 20. Here there are provided a pair of reels 85a and 85b for two reinforcement strips fed together through a common guide 93 into the funnel 95. In this embodiment it is contemplated that a pair of strips will be fed through each of the guides providing for the laying up of a given layer or ply of the reinforcement. If desired a similar multiple feed arrangement may be used for each of the several plies, and in this way, if desired, a relatively thick wall reinforcement may be laid up, for instance for the production of relatively thick walled pipe or other tubular articles.

*The reinforcement elements*

In connection with the nature of the fibrous strips employed for the reinforcement, a number of factors should be kept in mind:

First, while various features of the invention are applicable to articles incorporating fibrous reinforcements of a wide variety of types, such as cellulosic mats, felting or woven fabrics, and various kinds of paper, the apparatus and method of the invention are particularly useful in connection with the employment of glass fiber reinforcements, which may take a variety of forms such as mats or felted type sheet or strip material, woven fabrics or cloth, rovings, and combinations of these forms. For certain purposes, such as the manufacture of pipe, I prefer to employ fibrous strips and still further I prefer to employ a certain combination of fibrous strips, some of which incorporate substantial quantities of fibers which are oriented lengthwise or axially of the strips and some of which incorporate substantial quantities of or even all of the fibers in random distribution or orientation.

In further explanation of this matter reference is here made to FIGURES 23, 24 and 25 which illustrate in a somewhat simplified or diagrammatic way three different types of fibrous strip material contemplated to be employed for various different purposes in accordance with the invention.

In FIGURE 23 there is a fragmentary illustration of a mat type of strip in which the fibers are all of random orientation. Glass fiber mat of this type is available in various weights or densities, running anywhere from about ½ ounce per square foot up to several ounces per square foot. Usually this type of material is made up of monofilament fibers and has a tendency to maintain a spongy or resilient texture even when wetted with liquid resin. The presence of the mono-filament fibers also appears to enhance the capability of the material to be readily impregnated with the resin.

Felted or matted random material of the type shown in FIGURE 23, however, does not have substantial tensile strength in any direction, and for certain purposes I prefer to employ a different type of fibrous material having greater tensile strength, especially in the direction lengthwise of the strips and thus lengthwise or axially of the article being formed. Such a material made of glass fibers is illustrated in FIGURE 24 also in a somewhat simplified or diagrammatic manner. This material has some fibers which are arranged in random orientation, but in addition this material incorporates rovings extended lengthwise of the strip, i.e. from the top to the bottom of the figure as viewed in FIGURE 24. This combination of rovings incorporating filaments or fibers oriented lengthwise of the strip, together with other fibers of random distribution is also available in various different weights, for instance in weights running from one to several ounces per square foot. The number of individual filaments in the rovings employed in a mat of this type may also vary as may the spacing of the rovings. In a typical mat of this type "20 end" rovings at a spacing of about 5 or 6 per inch of width may be employed. In any event the rovings contribute considerable strength, especially lengthwise of the fibrous reinforcement strips and thus axially of the piece being made.

FIGURE 25 illustrates still another type of fibrous reinforcement, in this instance a woven or cloth type of glass fabric in which the fibers, each incorporating many filaments, are woven together in some pattern providing substantial strength usually in both directions as compared with the random fiber type of mat. Such a cloth or woven fabric is used for several purposes in the invention and while FIGURE 25 illustrates a square or pain weave, other types of fabric of various other weaves may also be utilized. The use of such a fabric will be more fully explained herebelow in connection with the starting procedure employed according to the invention. However, before proceeding with a description of that starting procedure, reference is again made to the construction or makeup of the reinforcement as preferably employed in a pipe, for instance as illustrated in FIGURE 16.

In accordance with the invention the innermost and outermost layers or plies R1 and R4 of the reinforcement are made up of strips of fibrous material in which at least some considerable fiber orientation is present. For this purpose I prefer to employ mat of the type illustrated in FIGURE 24 in which the rovings provide substantial tensile strength in the fibrous reinforcement in a direction axially of the piece being formed. At the same time I prefer to utilize for the intermediate layers R2 and R3 mat of the type in which the fibers are randomly oriented for instance mat of the type illustrated in FIGURE 23. Several advantages flow from this combination of fibrous strips including the fact that the rovings present in the plies R1 and R4 give good tensile strength axially of the piece and especially axially of the layers of reinforcement which are in contact with the internal and external walls of the annular forming passage, these layers naturally being subject to tensile forces tending to rupture the reinforcement during the actual forming and curing operation while the materials are passing through the die structure. The sandwiching of the random fiber strips of the type shown in FIGURE 23 in the internal portion of the reinforcement of the pipe wall enhances the impregnation of the reinforcement and assures that the resin will penetrate all the way to the interior of the pipe wall and thus minimize the presence of voids or porosity. The springy or resilient texture or character of the random fiber mats also aids in "filling out" the die or forming passage, and "absorbing" so to speak some of the irregularities which may be present in other components of the reinforcement employed. A combination of this type has been found to give particularly effective results both from the standpoint of method of production and also in the article itself, especially where the strips making up the several plies or layers of the reinforcement structure are laid up in staggered relation as illustrated in FIGURE 16, providing for overlapping of the joints between the strips of one ply by the strips of adjacent plies. In this way, notwithstanding the fact that the strips extend in the finished article in the axial direction thereof, good strength is provided in the article not only axially but also circumferentially.

*The resin material*

In connection with the resin material employed according to the invention, it is first noted that the invention is particularly concerned with the use of thermosetting or heat hardenable resin materials, preferably resin materials of the polyester type, sometimes also referred to as alkyd resins. Resins of that type are commonly formed by a reaction of a dibasic acid with a polyhydric alcohol. Reaction products formed in this way and having unsaturation in the molecule are preferably used according to the invention and are employed in combination with a cross-linking agent, commonly a monomer such as styrene.

Such resin materials before curing are relatively stable at room temperature and comprise a more or less mobile liquid. It is also preferred to employ a lubricant such as carnauba wax distributed in the resin.

*Starting procedure*

In considering the starting procedure reference is first made to certain structural arrangements, for which purpose attention is directed to FIGURES 1, 4 and 21. The plate 108 at the bottom of the die structure is connected with the end member 68 of the framing of the puller mechanism by means of bolts 109. Slotted holes are provided either in the plate 108 or in the part 68, or in both, in order to permit relative shifting movement of the die structure with relation to the puller mechanism and thus with relation to the line of pull established by the puller mechanism. In this way when the parts are assembled the axis of the forming passage in the die structure may be properly aligned with the axis of pull by the puller mechanism.

By removal of the bolts 109 the entire upper portion of the equipment may be lifted from the framing 68 of the puller mechanism, without disturbing the position or support of the puller mechanism. Thus, the puller mechanism is in effect supported on the structural elements E independently of the die structure and of the resin and reinforcement supply means. On the other hand the die structure and the resin and reinforcement supply means are supported on the puller mechanism in a manner providing for removal thereof for purposes to be explained.

At the top of the mechanism is a lifting eye 110 (see FIGURE 4), this eye being connected to the upper end of the parts fastened to the core and serving to lift the entire upper portion of the apparatus down to and including the die structure A. This is accomplished by virtue of the fastening of the plate 87 to the upper end of the core and the fastening of the die structure to the plate 89 and through that plate to the struts 88 which are connected at their upper ends to the plate 87.

An important advantage in providing for this unitary separation and lifting of the upper portions of the apparatus is that this facilitates the threading operation.

In general, the threading operation is accomplished as follows:

After separation and lifting off of the upper structure, various strips of fibrous reinforcement are threaded from supply reels through the guides 93 and funnels 95, 96 and 97 and also through the resin reservoir C and the die structure A, in the absence, however, of resin in the resin reservoir. The lower ends of the reinforcement strips threaded through the structure are drawn through sufficiently to project a distance below the delivery end of the forming passage in the die structure, and then a pulling a device 111 such as shown in FIGURE 22 is inserted in the open end of the reinforcement structure and fitted up to the lower end of the core in such a way that the counter-bored hole 111a of the device 111 fits over the lower end of the central core rod 63 and its nut. The ends of the reinforcement strips are tied to this pulling device as by cord indicated at 112 in FIGURE 21. This fastening is accomplished in a manner to leave the apertured lugs 113 at the lower end of the pulling device 111 projecting so that they may be fastened by means of the pin 114 to an apertured lug 115 formed at the upper end of a pilot piece 116.

The upper portion of the pulling device 111 is preferably of slightly smaller diameter than the diameter of the article being formed and this pulling device is also of reduced diameter below the upper portion so as to be in general of doorknob shape and thus provide for tight fastening of the ends of the reinforcement strips thereto when tied by the cord 112. The pilot piece 116 is desirably of diameter and shape conforming with the cross section of the article to be formed and, as seen in FIGURE 21, after the pulling device has been fastened to the reinforcement structure, the upper portions of the mechanism are replaced on top of the puller mechanism and fastened in position and the pin 114 inserted so as to connect the pulling device 111 to the pilot piece 116 which extends downwardly therefrom along the line of pull and into the grip of the crawler tread devices 70 of the puller mechanism.

Following the threading operation above briefly described and also the position of the pilot piece 116 in the puller mechanism and following the connection of the pulling device 111 to the pilot piece 116, the operation may be started by first heating the die and core structure by introduction of heating steam into the chambers 33 and 42. The flow of cooling water through the cooling chambers at the entrance and exit ends of the die and core may also be started. When the heating chamber has been brought up to proper temperature, resin is introduced into the resin pan 83 and after a short interval to provide for impregnation of the reinforcement structure, the puller mechanism is started and the pilot piece is thereby advanced, thus pulling the pulling device 111 and also initiating the downward movement of the reinforcement through the die structure. As the resin impregnated portion of the reinforcement emerges from the lower end of the die structure, it enters the puller mechanism and in due course the puller mechanism grips the solidified article itself and continues the advancement thereof in the manner already referred to above. It will be noted that the length of the puller mechanism is several times the length of the die structure, in view of which the pilot piece will continue to be engaged by the puller mechanism until completely formed and solidified tubing has reached and entered some considerable distance into the puller mechanism.

The foregoing starting procedure may be carried out substantially in the manner generally described utilizing reinforcement strips of the type desired in the finished article, but it is preferred to utilize certain other types of reinforcement strips temporarily during the starting procedure, in order to facilitate the threading operation and other aspects of the starting operation.

Thus, in a preferred starting operation I initially thread through the die structure a plurality of reinforcement strips in the form of woven fabric such as illustrated in FIGURE 25, and preferably two layers or plies of such woven strips are initially threaded through the die structure (in the absence of resin in the resin pan), and thereafter strips to make up additional plies of reinforcement in the form of mats, for instance either of the kind shown in FIGURE 23 or the kind shown in FIGURE 24 are introduced in between the two woven fabric plies. This assemblage of strips is then fastened to the pulling device 111 and the starting operation proceeded with in accordance with the foregoing description. When solidified article (containing the woven fabric layers) is advanced sufficiently to be gripped by the puller mechanism, I then prefer to substitute at the source of supply of the woven strips, other strips advantageously in mat form, for instance of the type illustrated in FIGURE 24, and ultimately the finished article is made in a manner to incorporate various forms of mat strips, eliminating entirely the woven fabric strips which were used in the initial threading.

There are several reasons why the foregoing procedure is advantageous, including the following:

In the first place when making a tubular article such as a pipe and especially in the case of a thin walled pipe, the annular passage through the die structure is of such small section or thickness that it is exceedingly difficult to thread the relatively thick and bulky mat type of reinforcement strips through the forming passage. The woven fabric forms of reinforcement, however, are relatively thin, especially in relation to their tensile strength, and these thin strips may readily be pushed through the forming passage, or even dropped by gravity through the passage and thereafter used as a means for drawing the more bulky strips ultimately desired through the die passage. Moreover the initiation of the operation represents a condition in which breakages of the reinforcement are most likely to occur. Stoppage of the apparatus at this time would necessitate dismantling portions of the apparatus in order to clean out the forming passage and perform other operations which are uneconomical in the operation of such equipment. The greater strength of the woven fabric strips avoids such breakages and presents a more consistently successful means for initiating the operation.

In a specific instance a typical starting operation proceeds as follows, reference being made to FIGURES 3 to 7 and 21 to 25:

(1) With the upper portions of the mechanism lifted away from the puller mechanism, one layer or ply comprising three strips of woven fabric is threaded through the guides 93 and into the funnel 95 and from there downwardly along the core and through the forming passage to project below the die structure. This is affected in the absence of resin in the resin pan 83 and without resin being applied to the upper end of the core.

(2) A second similar ply of three strips of woven fabric is pulled through the lowermost guides 93 and thence downwardly through the forming passage, this second group of strips being fastened to the first so that the first serves to draw the second through the passage, or in some cases the first one will carry the second through the die passage merely by simple friction.

(3) One layer or ply comprising three strips of a mat type of material, for instance as shown in FIGURE 24, is fed from reels 85 through guides 93 into the second funnel 96 and thence downwardly between the woven fabric strips, being fastened thereto by stapling or stitching if needed, and thereby being drawn through the forming passage.

(4) A second similar ply of three strips of mat such as shown in FIGURE 24 are introduced through the guides 93 delivering into the funnel 97 and similarly fastened to other fabric layers and thus drawn through the forming passage. This makes a total of four plies comprising two woven fabric plies lying respectively next to the core and die surfaces, and two plies of mat intervening, and with the strips of the several plies staggered or shingled around the cavity so that all joints are covered.

(5) When all of these strips are drawn through the fibrous passage, the strips are cut off at a location about 4 to 6 inches below the end of the die.

(6) The pulling device 111 is then inserted and fastened by means of a cord such as shown at 112 and this assembly is then preferably impregnated below the lower end of the die with an adhesive, such as a room setting resin and is allowed to dry or cure.

(7) The pilot piece or dummy tube 116, which may comprise a piece of metal pipe, or if desired a piece of wood, is mounted in the puller mechanism and adjusted to the proper position to enable fastening of the puller device 111 when the parts are assembled.

(8) The upper portion of the mechanism is now mounted on the frame of the puller mechanism and properly aligned therewith, the device 111 being connected to the pilot piece by means of pin 114.

(9) The connections are made to the heat transfer passages of the die and core structures, and the central region of the die and core is heated.

(10) If desired, at this point, a fifth ply consisting of three strips of mat such as shown in FIGURE 24 may be introduced into the system, for instance from a multiple reel arrangement of the kind shown in FIGURE 20, although the strips of this fifth ply would preferably be fed with and just inside of the strips forming the outermost ply of woven fabric.

(11) When the fifth ply is used as referred to in Step No. 10 just above, the puller mechanism is started and the assembly of reinforcement elements is pulled until the leading end of the fifth ply is at the delivery end of the die structure and at this point the machine is stopped.

(12) Whether or not the fifth ply is used, after the heating of the die and core has become stabilized, liquid resin is poured into the resin pan 83 up to the required level, for instance 10 or 12 inches above the bottom of the resin pan. Resin is also introduced into the resin pans 99 (see FIGURE 18). The system is then allowed to remain at least for a short interval, for instance about a minute, to give time for some substantial impregnation of the fiber reinforcement by the resin, although this period of rest should not permit any large quantity of resin to run down into the die cavity and become hardened thereon from the heat before starting the puller mechanism.

(13) The puller mechanism is then started and the reinforcement structure in impregnated condition now moves downward through the forming passage.

(14) When impregnated and cured material, i.e. solidified article, appears at the delivery end of the forming passage, the woven fabric strips making up the outer ply of the reinforcement are cut off at a point ahead of the entrance end of the guides 93 (of the lowermost group) and at the same time a layer consisting of three strips of random fiber mat such as shown in FIGURE 23 is introduced through a group of guides 93 which will bring this new layer into an intermediate position. This may usually be accomplished without stopping the machine, but a short interval of stoppage may be effected if the time is needed for making the arrangement and effecting the fastenings.

(15) When the trailing end of the woven strips which initially form the outermost ply has proceeded through and beyond the die, the innermost ply of woven strips is cut and similarly replaced with a layer of three strips of mat, for instance of the type shown in FIGURE 23, located in an intermediate position.

In accordance with the foregoing, the operation is thus established in a manner providing a reinforcement comprising 4 or 5 layers or plies, the outermost ones of which are formed of mat of the type shown in FIGURE 24 having some appreciable fiber orientation axially of the piece being formed and the intermediate ones of which are formed of mat as shown in FIGURE 23 in which in whole or in large part the fibers are randomly oriented.

When the operation is being started and continuing until formed tube is gripped by the puller mechanism, it is desirable to leave the bolts 109 (see FIGURE 21) loose until the initial operation indicates what alignment is needed to bring the formed tube exactly in line with the line of pull of the puller mechanism. To make sure of this alignment, if necessary, the drive of the puller mechanism may be momentarily reversed in order to give the die freedom to slide into the correct position. When proper alignment has been established, the bolts 109 are of course tightened.

During feed of the reinforcement downwardly through the resin pan and into the entrance end of the forming passage, the reinforcement will of course carry into the entrance end of the passage an excess of resin which will be expelled back into the resin pan because of the taper of the entrance end of the forming passage. This taper aids in compressing or compacting the reinforcement, which is desirably under a condition of some compression during the time the resin is being cured, which occurs in the mid non-tapered region of the die structure.

According to the foregoing a highly effective and reliable apparatus and method is provided for continuous formation of various articles, especially tubular articles such as pipe.

Attention is called to the fact that certain features disclosed herein are also disclosed and claimed in my co-pending application Serial No. 299,636, filed August 2, 1963.

I claim:

1. Apparatus for use in making tubular articles composed of fiber reinforced resin material, comprising a forming device having a tubular passage therethrough of cross sectional shape conforming with the cross section of the tubular article being formed and into one end of which the fiber reinforcement and the resin material are delivered, a group of reels for fiber reinforcement strips, the reels being arranged to rotate in angularly spaced planes arranged generally radially of the forming passage adjacent the entrance end thereof, guide means for delivering a plurality of reinforcement strips from said reels into the entrance end of the tubular passage in substantially edge-to-edge relation throughout the circumference of said passage, means for introducing liquid heat hardenable resin with the reinforcement into the entrance end of the tubular passage, means for heating the resin in said passage to solidify the article therein, and means engageable with the solidified article beyond the exit end of the forming passage for pulling the formed piece out of the forming device.

2. Apparatus according to claim 1 and further including a second group of reels positioned to rotate in radial planes lying between the radial planes of the reels of the first group, and additonal guide means for delivering strips of reinforcement from the second group of reels into the entrance end of the forming passage in substantially edge-to-edge relation throughout the circumference of said passage but in positions overlapping the edges of the strips of the first group.

3. Apparatus according to claim 1 and further including means for delivering liquid heat hardenable resin to the fiber reinforcement strips in advance of the guide means for delivering the strips in edge-to-edge relation into the entrance end of the forming passage.

4. Apparatus according to claim 1 in which the means for introducing liquid resin into the passage in the forming device comprises a resin reservoir between the entrance end of the forming passage and the guide means for the reinforcement strips and providing for passage of said strips through the resin in the reservoir in the travel thereof into the entrance end of the forming passage.

5. Apparatus according to claim 4 and further including means delivering liquid heat hardenable resin to the fiber reinforcement strips in advance of the resin reservoir.

6. Apparatus for use in making tubular articles composed of fiber reinforced resin material, comprising a forming device having a generally upright tubular passage therethrough of cross sectional shape conforming with the cross section of the tubular article being formed and into the upper end of which the fiber reinforcement and the resin material are delivered, a group of reels for fiber reinforcement strips arranged around the axis of the forming passage, guide means for delivering a plurality of reinforcement strips from said reels into the entrance end of the forming passage in substantially edge-to-edge relation throughout the circumference of the forming passage, means for introducing liquid heat hardenable resin with the reinforcement into the entrance end of the tubular passage, means for heating the resin in said passage to solidify the article therein, and means engageable with the solidified article beyond the exit end of the forming passage for pulling the formed piece out of the forming device.

7. Apparatus according to claim 6 in which the forming device includes a die structure and a core structure cooperating to form said tubular passage and in which the core structure has an extension projecting above the die structure, and in which the guide means for the reinforcement strips includes a guide element surrounding the upwardly projecting extension of the core and cooperating therewith to form an annular passage for shaping the reinforcement strips to an annular form.

8. Apparatus according to claim 7 and further including a second group of reels arranged around the axis of the forming passage and additional guide means for delivering strips of reinforcement from the second group of reels into the entrance end of the forming passage in substantially edge-to-edge relation throughout the circumference of said passage but in a layer surrounding the first group of strips.

9. Apparatus according to claim 7 in which the guide element which surrounds the upwardly projecting extension of the core comprises a guide funnel surrounding the core extension and tapered from an upper inlet opening to a lower outlet opening of reduced size as compared to the inlet opening.

10. Apparatus according to claim 7 and further including means for delivering liquid heat hardenable resin to the interface between the core extension and the reinforcement strips.

11. Apparatus according to claim 10 in which the means for delivering resin to said interface comprises resin supply means for delivering resin to the reinforcement strips in advance of entrance thereof into said annular passage.

12. Apparatus according to claim 10 in which the means for delivering resin to said interface comprises means for delivering resin to the surface of the core extension above the guide element surrounding the core extension.

13. A method for making tubular articles composed of fiber reinforced resin material, comprising feeding liquid heat settable resin material and fiber reinforcement through a tubular forming passage of cross sectional shape conforming with the cross section of the tubular article being formed, the fiber reinforcement comprising a group of fibrous strips which are positioned substantially in edge-to-edge relation throughout the circumference of the forming passage, and heating the resin in the forming passage to solidify the article therein.

14. A method according to claim 13 and further comprising feeding a second group of fibrous strips into the forming passage in a layer surrounding the strips of the first group.

15. A method according to claim 14 in which the strips of the second group overlap the joints between the strips of the first group.

16. A method for making tubular articles composed of fiber reinforced resin material, comprising feeding liquid heat settable resin material and fiber reinforcement through a tubular forming passage of cross sectional shape conforming with the cross section of the tubular article being formed, the fiber reinforcement comprising a group of fibrous strips which are positioned substantially in abutting edge-to-edge relation throughout the circumference of the forming passage, and the fiber reinforcement comprising a second group of fibrous strips surrounding the strips of the first group and positioned substantially in abutting edge-to-edge relation throughout the circumference of the forming passage, the total circumferential dimension of the strips of the second group being greater than that of the strips of the first group, and heating the resin in the forming passage to solidify the article therein.

17. A method for making tubular articles composed of fiber reinforced resin material, comprising feeding liquid heat settable resin material and fiber reinforcement through a tubular forming passage of cross sectional shape conforming with the cross section of the tubular article being formed, the fiber reinforcement comprising a group of fibrous strips which are positioned substantially in abutting edge-to-edge relation throughout the circumference of the forming passage, and the fiber reinforcing comprising a second group of fibrous strips surrounding the strips of the first group and positioned substantially in abutting edge-to-edge relation throughout the circumference of the forming passage, each group of strips including the same number of strips and the total circumferential dimension of the strips of the second group being greater than that of the strips of the first group and the strips of the second group being positioned to overlap the joints between the strips of the first group, and heating the resin in the forming passage to solidify the article therein.

18. A method for making tubular articles composed of fiber reinforced resin material, comprising feeding liquid heat settable resin material and fiber reinforcement through a tubular forming passage of cross sectional shape conforming with the cross section of the tubular article being formed, the fiber reinforcement comprising at least three layers of fibrous strips each including a plurality of strips substantially in edge-to-edge relation throughout the circumference of the article, the fibers of the strips of an intermediate layer being at least in large part of random orientation and the fibers of the strips of the innermost and outermost layers being in large part oriented axially of the tubular article being formed, and heating the resin in the forming passage to solidfy the article therein.

19. In the manufacture of tubular articles composed of finer reinforced resin material by feeding liquid heat settable resin material and fiber reinforcement through a tubular forming passage in which the resin material is heated to solidify the article, the steps of initially threading through the forming passage a layer of unimpregnated fiber reinforcement in the form of woven fabric and comprising a plurality of woven fabric strips substantially in edge-to-edge relation throughout the circumference of the article being formed, after said initial threading feeding with the woven fabric strips of unimpregnated fibrous mats incorporating fibers of random orientation and pulling the mat strips through the forming passage by pulling on the woven fabric strips, impregnating the woven fabric and mat strips with liquid heat settable resin in advance of the forming passage and feeding the impregnated strips through the forming passage to form and solidify the article therein, and after the solidified article appears at the delivery end of the forming passage, terminating the feed of the woven strips and continuing the feed of the impregnated mat strips.

20. A method according to claim 19 in which a plurality of layers of woven fabric strips are initially threaded through the forming passage, and in which the mat strips are sandwiched between the layers of woven fabric strips.

21. A method for initiating the operation of making an elongated tubular article composed of resin material incorporating fibrous reinforcement in a machine having a die structure with a forming passage therethrough in which liquid heat settable resin material is heated to solidify the article being formed and which machine also includes a mechanism for pulling the article being formed through said passage, which method comprises threading unimpregnated fibrous reinforcement through the forming passage, said reinforcement comprising a plurality of fibrous strips in substantially edge-to-edge relation in tubular form corresponding to the shape of the tubular article to be formed, beyond the delivery end of the forming passage inserting a pulling device into the end of the tubular form of the reinforcement and fastening the fibrous strips to the pulling device, inserting a pilot piece in the puller mechanism, connecting the pulling device to the pilot piece, impregnating the reinforcement with a liquid heat settable resin before entry into the forming passage, and starting the operation of the puller mechanism to advance the pilot piece and thus the pulling device to thereby pull the impregnated reinforcement through the forming passage.

22. A method according to claim 21 in which the pilot piece used is of external cross sectional shape conforming to that of the tubular article being formed.

23. A method according to claim 21 in which the fibrous strips threaded through the forming passage and fastened to the pulling device include strips in the form of woven fabric, the method further including feeding through the forming passage additional fibrous strips in the form of mats containing randomly oriented fibers, and after starting the operation of the puller mechanism terminating the feed of the woven fabric strips.

References Cited by the Examiner

UNITED STATES PATENTS

| | | | |
|---|---|---|---|
| 25,241 | 9/1862 | Randolph | 156—285 |
| 2,159,948 | 5/1939 | Hatch | 138—141 |
| 2,543,901 | 3/1951 | Dunne et al. | 138—141 |
| 2,682,292 | 6/1954 | Nagin | 156—187 |
| 2,751,320 | 6/1956 | Jacobs et al. | 156—441 XR |
| 2,778,404 | 1/1957 | Macy et al. | 156—180 |
| 2,871,911 | 2/1959 | Goldsworthy et al. | 156—380 |
| 2,887,721 | 5/1959 | Blanchi et al. | 18—4 |
| 2,948,649 | 8/1960 | Pancherz | 156—441 XR |
| 2,977,630 | 4/1961 | Bazler | 18—4 |

EARL M. BERGERT, *Primary Examiner.*